United States Patent
Hamanishi et al.

[19]

[11] Patent Number: 5,808,373
[45] Date of Patent: Sep. 15, 1998

[54] VEHICLE GLOVE BOX ADAPTED TO RECEIVE AND POWER ELECTRICAL EQUIPMENT

[75] Inventors: Nobutaka Hamanishi; Hiroshi Yamagishi, both of Nagoya, Japan

[73] Assignees: Harness System Technologies Research, Nagoya; Sumitomo Wiring Systems, Ltd., Yokkaichi; Sumitomo Electric Industries, Ltd., Osaka, all of Japan

[21] Appl. No.: 814,109

[22] Filed: Mar. 10, 1997

[30] Foreign Application Priority Data

Mar. 11, 1996 [JP] Japan .................................. 8-053362
Apr. 9, 1996 [JP] Japan .................................. 8-086274

[51] Int. Cl.⁶ ................................................ B60H 3/00
[52] U.S. Cl. .......................................... 307/10.1; 219/202
[58] Field of Search .......................... 307/9.1, 10.1–10.5, 307/10.8; 362/80; 315/77, 84; 340/458, 825.69, 825.72; 280/202; 219/202; 37/366; 224/400; 439/374

[56] References Cited

U.S. PATENT DOCUMENTS

| | | | |
|---|---|---|---|
| 3,757,851 | 9/1973 | Marble | 37/366 |
| 4,286,262 | 8/1981 | Wahl | 340/825.72 |
| 5,184,132 | 2/1993 | Baird | 340/825.69 |
| 5,444,430 | 8/1995 | McShane | 307/10.2 |
| 5,486,118 | 1/1996 | Colleran et al. | 439/374 |
| 5,645,340 | 7/1997 | Colton | 362/80 |

*Primary Examiner*—Richard T. Elms
*Attorney, Agent, or Firm*—Oliff & Berridge, PLC

[57] ABSTRACT

Various electric equipment which are increasing more and more are accommodated in a glove box. The accommodating means has such a structure in which a computer C, a cellular telephone T and the like are fitted on rails provided on a glove box cover. By the fitting of those equipments, power sources and signals can be delivered (supplied) between the electric equipment and other various equipment provided in an instrument panel through connectors and cords. The delivery is performed under distribution and processing in a conversion substrate. A glove box lamp is attached to a substrate on a opening of the glove box so as to be connected to the current conduction path. A switch for turning on/off the glove box lamp is further attached to the substrate so as to be connected to the current conduction path. Respective lead wires of wire harness W/H are connected directly to the current conduction path of the substrate without interposition of any connector.

9 Claims, 6 Drawing Sheets

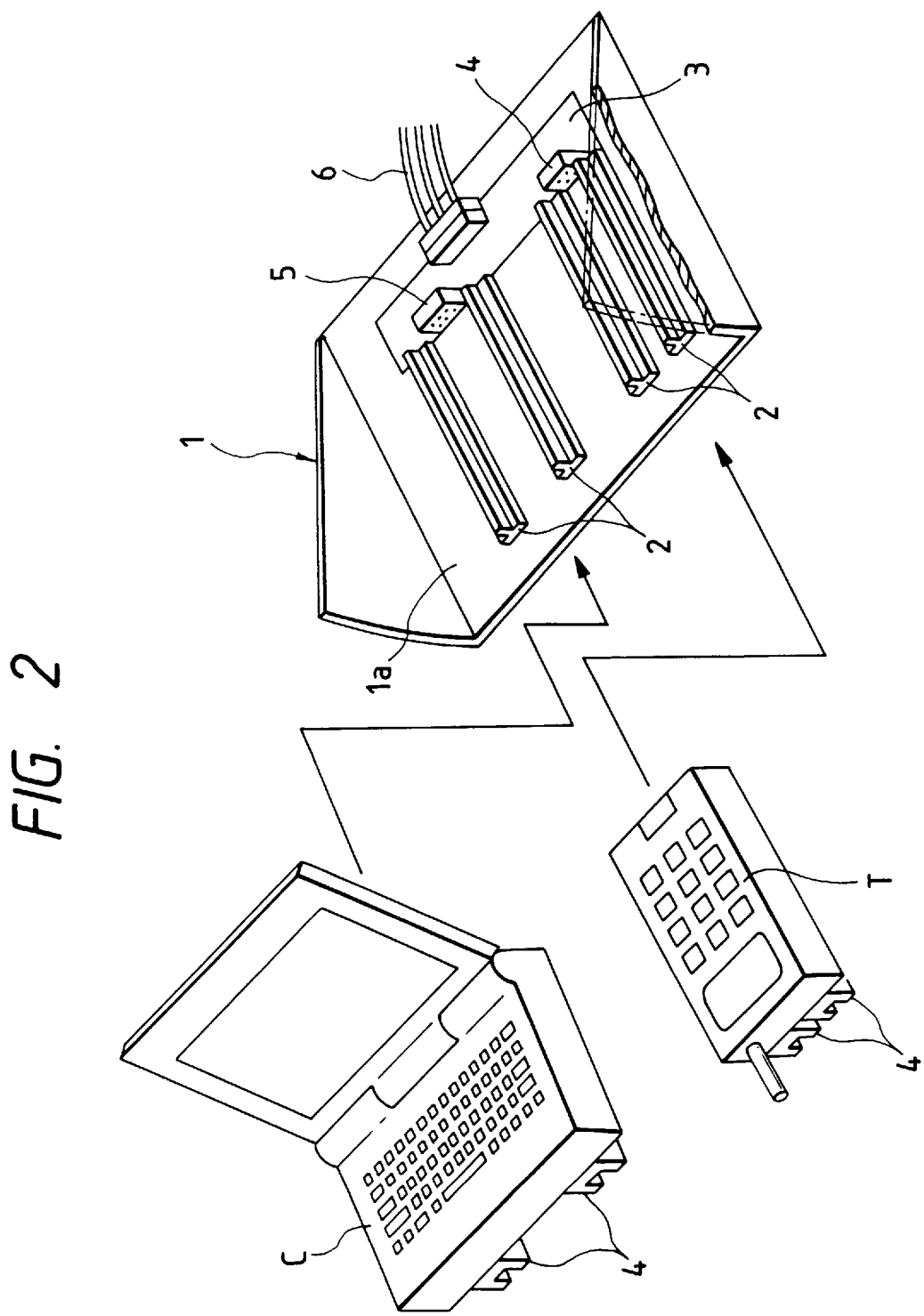

VEHICLE GLOVE BOX ADAPTED TO RECEIVE AND POWER ELECTRICAL EQUIPMENT

BACKGROUND OF THE INVENTION

1. Field of the Invention

The present invention relates to an improvement for an effective use of a glove box portion which is provided in the front portion inside a vehicle.

2. Description of the Related Art

In a vehicle, as shown in FIG. 1, a glove box 1 is provided in front of a passenger seat so as to be utilized to receive therein papers and small goods.

Today, however, mobile electric equipment (including various electronic equipment such as a portable telephone, and the like, which are carried in a vehicle) keep on increasing to thereby cause a problem of how to secure the position of attachment of the mobile electric equipments. Although equipment, for example, a CD changer, a car navigation system, and the like, are provided in a trunk having a comparatively wide space, an operation portion of the equipment is provided on the driver's seat side and it is therefore necessary to provide wiring from the location of the equipments in the trunk to the driver's seat side. In a structure in which a television, a car navigation system, and the like, are operated by combination of various equipment, particularly, wiring thereof is complicated and work of the wiring is very troublesome. Further, in the case of a CD changer, a user is required to get out of a car and open the trunk troublesomely to perform exchange of a CD per se.

Increase of various electric equipment causes reduction of papers, for example, a car navigation system makes atlases unnecessary. Consequently, the fact is that many unnecessary goods are accommodated in a glove box 1 at present.

Further, in case of the conventional glove box lamp, as shown in FIGS. 8 and 9, there is provided a glove box lamp 7 for illuminating the inside of a glove box 1 connected to an electric source in such a manner that the lamp 7 and a switch 8 for turning on/off the lamp 7 are attached to a lamp holder 9 attached to an inner wall of the glove box 1 and are connected to a connector 10 received in the inside of the lamp holder 9, and a connector 11 connected to wire harness W/H is fitted to the connector 10.

The aforementioned switch 8 is disposed on an opening 1b side of the glove box 1 so that the switch 8 is pressed into an off state by an inner surface of a cover 1a to thereby turn off the glove box lamp 7 when the cover 1a is closed to shut the opening 1b, while the pressure exerted on the switch 8 is released to make the switch 8 be into an on state to thereby turn on the glove box lamp 7 when the cover 1a is opened.

In the aforementioned attachment structure of the glove box lamp 7, the connectors 10 and 11 are required for connecting the lamp 7 and the switch 8 to the wire harness W/H. Accordingly, because the number of parts and the number of attachment steps are increased, there arises a problem that cost is increased. In addition, because a space occupied by the connector 11 is required in the inside of the glove box 1, there arises a problem that wastefulness of the space occurs. Furthermore, if the glove box lamp 7 is projected the inside of the glove box 1, it is a fear that the glove box lamp 7 obstructs to accomodate relatively big goods.

SUMMARY OF THE INVENTION

Under such current circumstances, an object of the present invention is to secure a space in the front portion in a vehicle for accommodating (or attaching) various electric equipments.

In order to solve the foregoing conventional problem, according to the present invention, a glove box is used for providing a space for accommodating (or attaching) various electric equipment which are increasing more and more. According to an aspect of the present invention, a vehicle glove box structure which is provided in a front portion in a vehicle includes a first glove box provided in an instrument panel, the first glove box including at least one of electric equipment in an inside thereof and being detachably provided to replace by a second glove box which is the same specification as that of the first glove box.

For example, if a standard glove box is made to be detachably attached so that the glove box is replaced by a selected one of boxes having various equipments of different functions on the basis of the request of a user, it is possible to obtain a vehicle having the function of the equipments in the selected box.

As described above, when the glove box is used to provide a space for accommodating (or attaching) various electric equipment that is are invisible or inconspicuous by riders and therefore the appearance is held to be good in the same manner as in the conventional case. Further, in the case of a CD exchanger, a user can exchange a CD without getting out of the vehicle.

BRIEF DESCRIPTION OF THE DRAWINGS

The nature, utility and principle of the invention will be more clearly understood from the following detailed description and the appended claims when read in conjunction with the accompanying drawing. In the accompanying drawings:

FIG. 2 is an exploded perspective view showing the main portion according to the present invention;

DETAILED DESCRIPTION OF THE INVENTION

Figure 1:
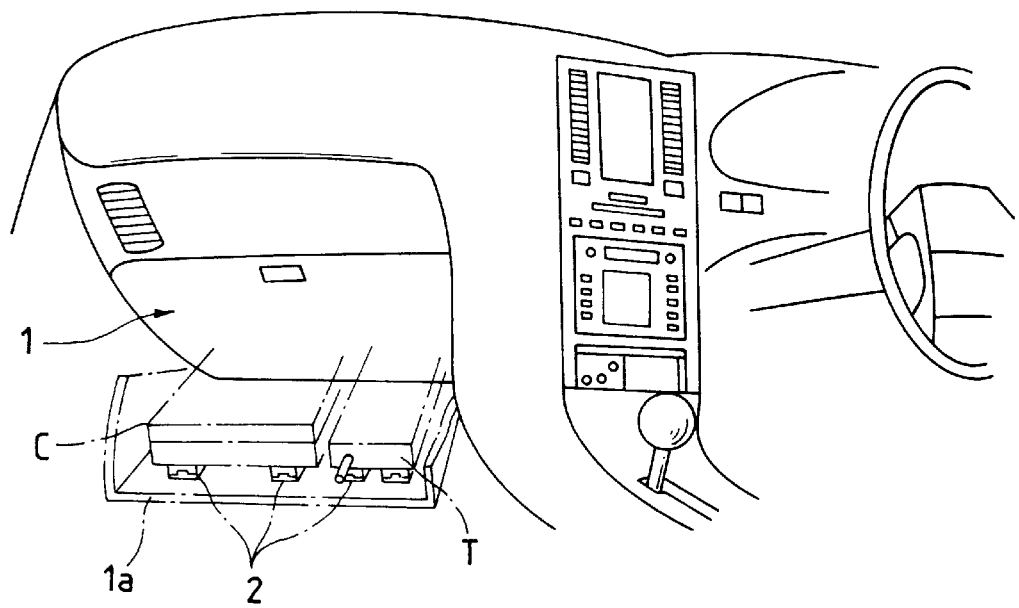
FIG. 1 is a perspective view showing a main portion according to the present invention.
Figure 3:
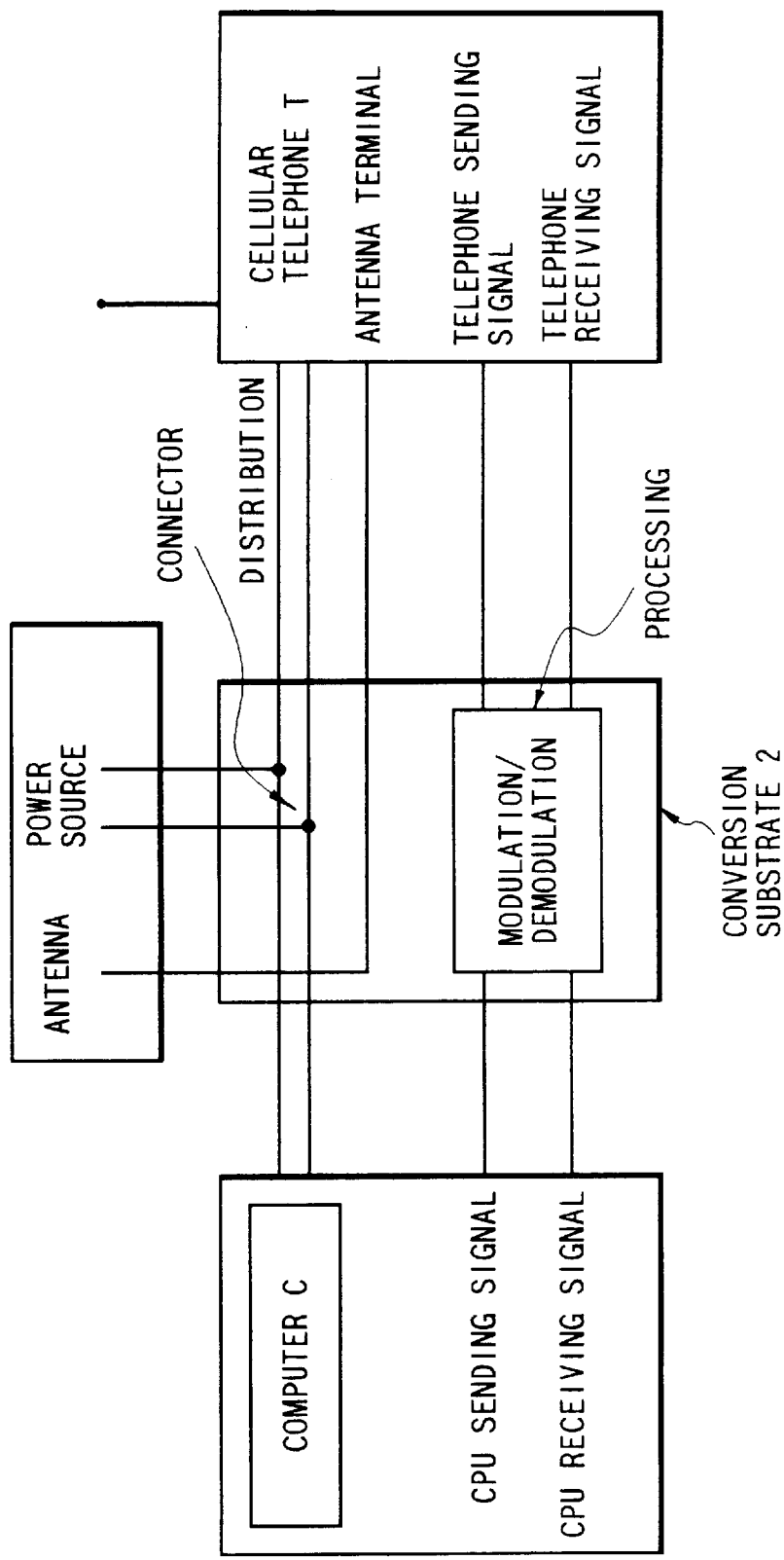
FIG. 3 is a view for explaining the operation of electronic equipment according to the present invention.

FIGS. 1 to 3 show an embodiment of the present invention. In this embodiment, rails 2 and a conversion substrate 3 are provided on an inner surface of a cover 1a of a glove box 1. A small-size personal computer C and a cellular telephone T are mounted on the rails 2 through other rails 4 of the equipment C and T per se. The equipment C and T are mounted on the rails 2 in such a manner that their own connectors are connected to connectors 5 provided on the substrate 3 so that the equipment C and T are connected, through cords 6, to various equipment mounted in an instrument panel to thereby enable power sources and various signals (including a high-frequency signal) to be inputted/outputted. The power sources and various signals are distributed and processed in the substrate 3. For example, in the case of the computer C and the cellular telephone T, as shown in FIG. 3, the equipments C and T are connected to the instrument panel through the conversion substrate 3 so that distribution and processing (modulation/demodulation, control, and the like) are performed in the conversion substrate 3.

Figure 4:
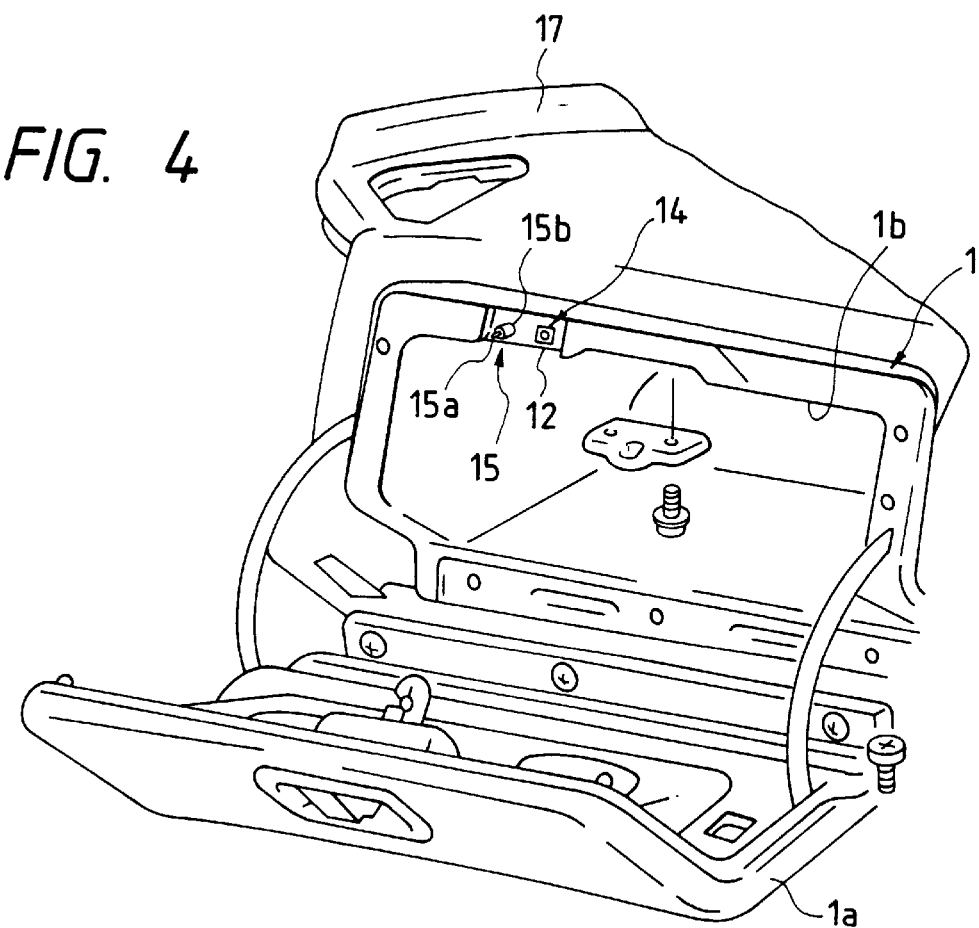
FIG. 4 is a perspective view showing an attachment structure of a glove box lamp according to the present invention.
Figure 5A:
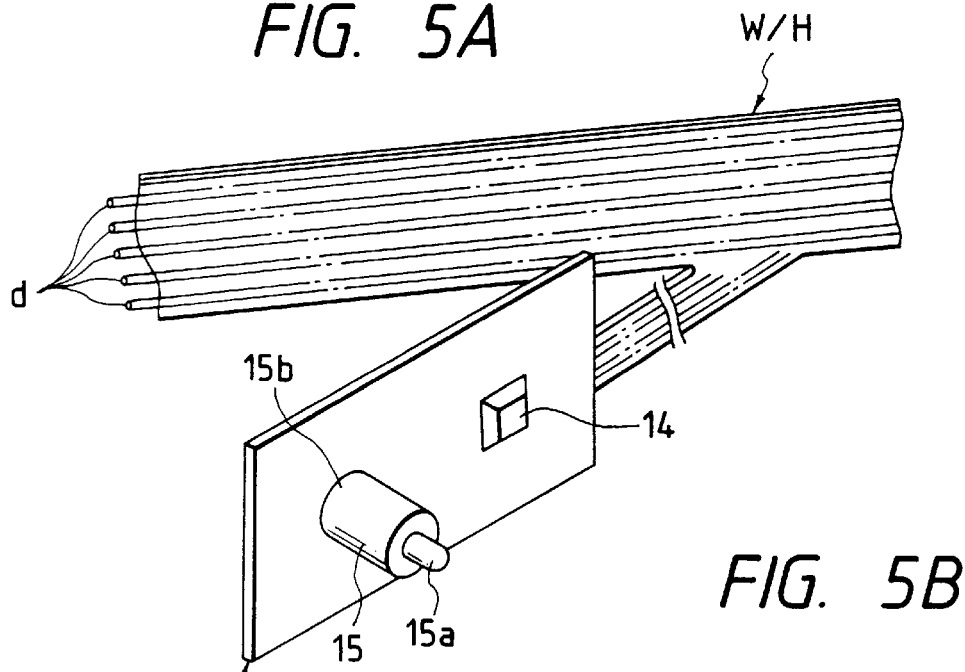
FIG. 5A is a perspective view showing flat harness and a substrate.
Figure 5B:
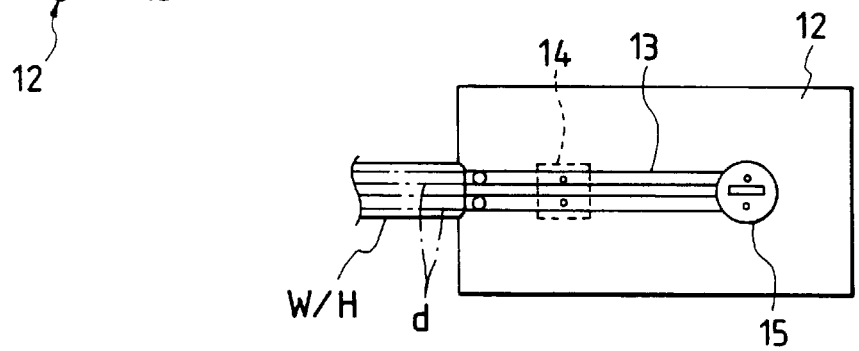
FIG. 5B is a rear view showing a state in which lead wires are connected to a current conduction path of the substrate.

As shown in FIGS. 4 to 5B, in an attachment structure of a car glove box lamp according to the present invention, a printed-wiring substrate 12 having a current conduction path 13 provided thereon is attached to an upper inner wall of a glove box 1 whereas a glove box lamp 14 and a switch 15 for turning on/off the glove box lamp 14 are attached to the substrate 12 and connected to the current conduction path 13 by soldering.

Lead wires d of wire harness W/H laid in the inside of an instrument panel 17 and constituted by flat harness are connected directly to the current conduction path 13 of the substrate 12 by soldering without using any connector. The flat harness is designed so that electric conductors are arranged in parallel with each other and fixed in a state in which the electric conductors are nipped between upper and lower electrically insulating resin sheets. The flat harness branches off so as to be partially distributed to the glove box side, and the ends of the respective electric conductors are exposed to the outside from the electrically insulating resin sheets so as to be soldered to the current conduction path 13.

After the substrate 12 is inserted into the inside of the glove box 1 from the back of the instrument panel 17 in a state in which the substrate 12 is directly connected to the ends of the wires of the wire harness W/H in advance, the substrate 12 is attached to the upper inner wall of an opening 1b by means of screwing, or the like.

When a cover 1a for shutting the opening 1b of the glove box 1 is closed in the aforementioned attachment state, an operation portion 15a of the switch 15 is pressed, by the inner surface of the cover 1a, toward the inside of a body portion 15b to separate contact points from each other into an off state to thereby turn off the glove box lamp 14. When the cover 1a is opened, on the contrary, the pressure exerted on the operation portion 15a is released to make the contact points contact with each other into an on state to thereby turn on the glove box lamp 14 for illuminating the inside of the glove box 1.

Because the attachment structure according to the present invention is designed so that the glove box lamp 14 and the switch 15 are connected directly to the current conduction path 13 of the substrate 12 as described above, no connector is required for connecting the glove box lamp 14 so that the number of connectors can be reduced to attain reduction of cost. Furthermore, because no space occupied by the connector is required in the inside of the glove box 1, space saving can be attained. In addition, because the working process required in the prior art for fitting/connecting the connectors is not required at the time of assembling, improvement in workability can be attained.

Figure 6:
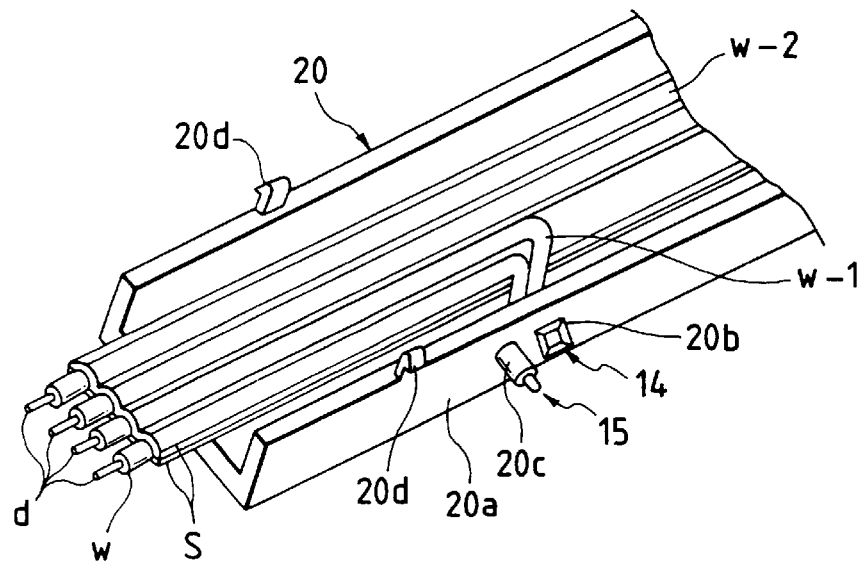
FIG. 6 is a perspective view showing an another attachment structure of the glove box lamp according to the present invention.

FIG. 6 shows an another attachment structure of the glove box lamp according to the present invention. In the second embodiment, a gutter-shaped protector 20 made from resin is provided so as to protect the wire harness W/H in a state where the wire harness W/H is inserted into the inside of the protector 20. The glove box lamp 14 and the switch 15 are attached to a side wall 20a of the protector 20. Specifically, attachment holes 20b and 20c are formed in one side wall 20a of the protector 20 and the glove box lamp 14 and the switch 15 are attached to the protector 20 so as to be fitted and supported in the attachment holes 20b and 20c respectively. Further, the protector 20 is provided with lock claw portions 20d, 20d projecting from the opposite side walls 20a, 20a so that the lock claw portions 20d, 20d are engaged with lock holes (not shown) formed in the opening 1b side upper inner surface of the glove box 1 and are extended in the direction of the width of the glove box 1 so as to be detachably attached to the inside of the glove box 1.

In this embodiment, ribbon jumper wires constituted by coated electric wires w having upper and lower surfaces coated with resin sheets S respectively are used as the wire harness W/H laid in the inside of the protector 20. Electric wires w-1 as a part of the ribbon jumper wires are connected directly to the glove box lamp 14 and the switch 15 in the inside of the protector 15. Electric wires w-2 for power source and feeding signals, or the like, to other electronic equipments are laid in the back of the instrument panel 17 so as to pass through the side wall of the glove box 1.

Because, in the another attachment structure of the glove box lamp according to the present invention, no connector is required for connecting the glove box lamp in the same manner as in the first embodiment, reduction of cost can be attained. Furthermore, because lead wires d and connection portions of the glove box lamp 14 and the switch 15 are located in the inside of the protector 20, the connection portions can be protected. In addition, the protector per se can be used as a member for holding both the lamp and the switch.

Figure 7A:
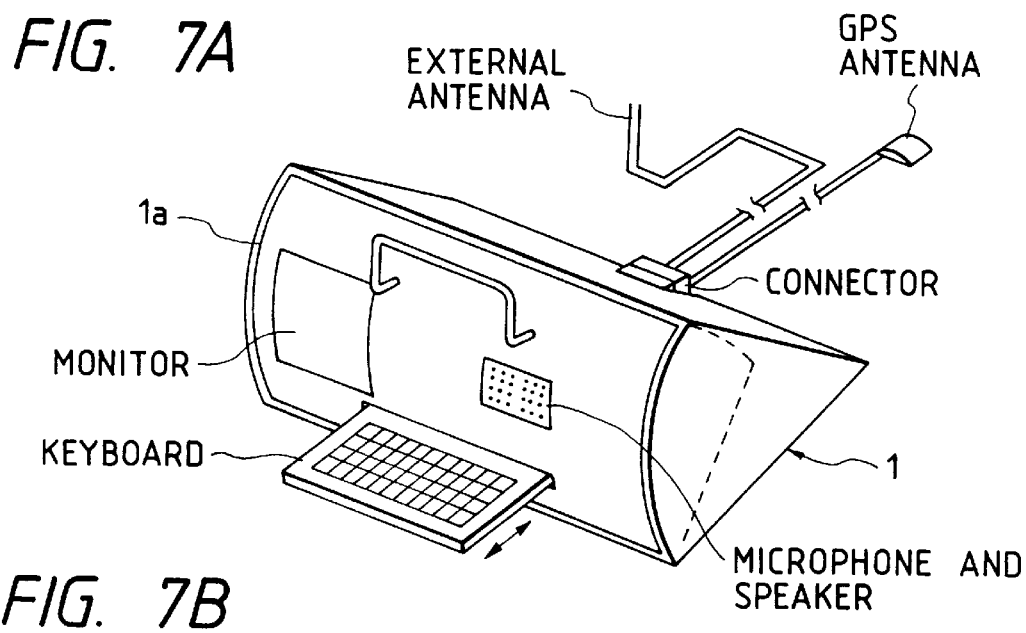
FIGS. 7A to 7C are perspective views schematically showing other utilizations of the glove box respectively according to the present invention.
Figure 7B:
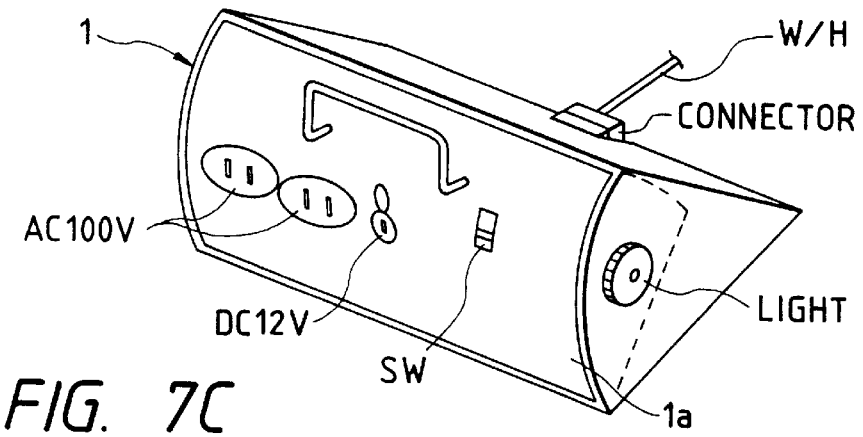
Figure 7C:
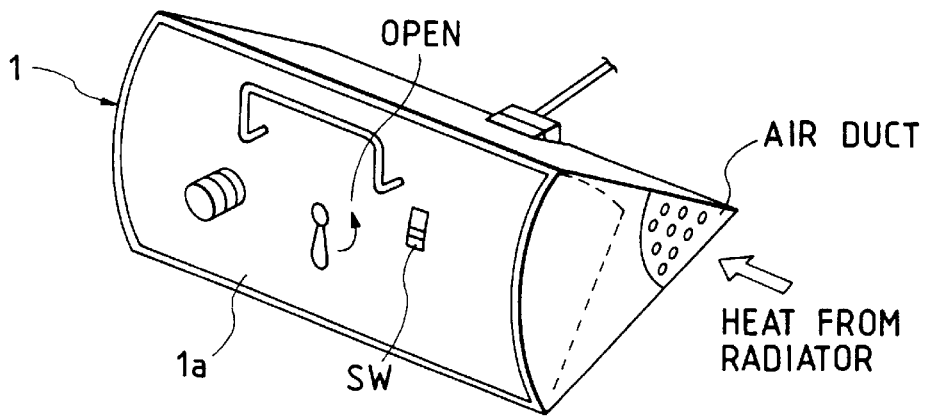
Figure 8:
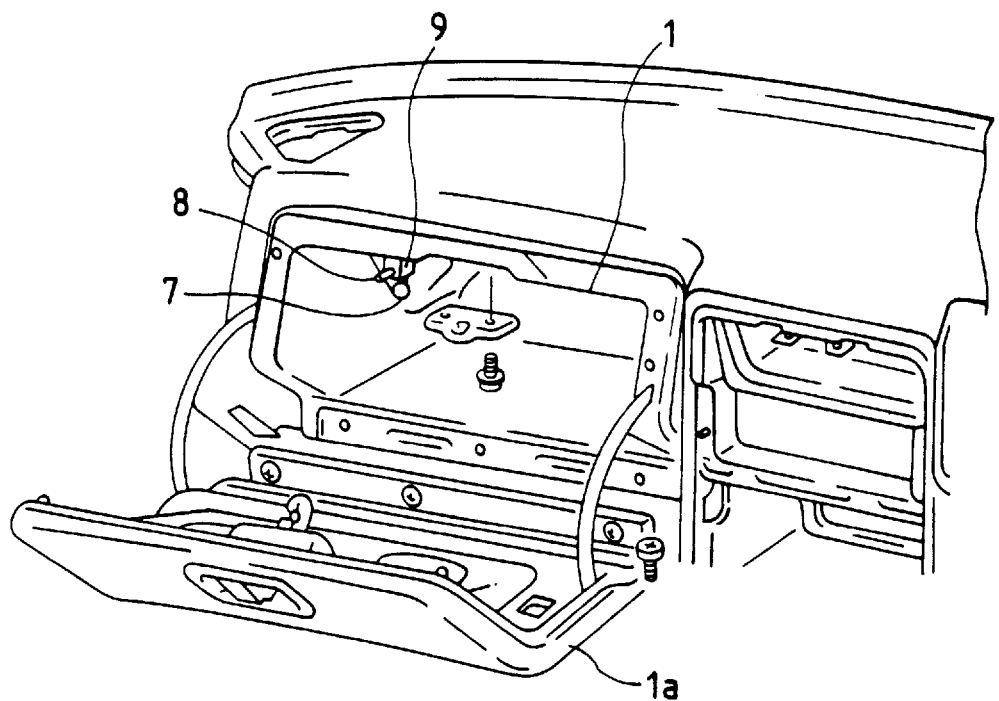
FIG. 8 is a perspective view showing a conventional attachment structure of the glove box lamp.
Figure 9:
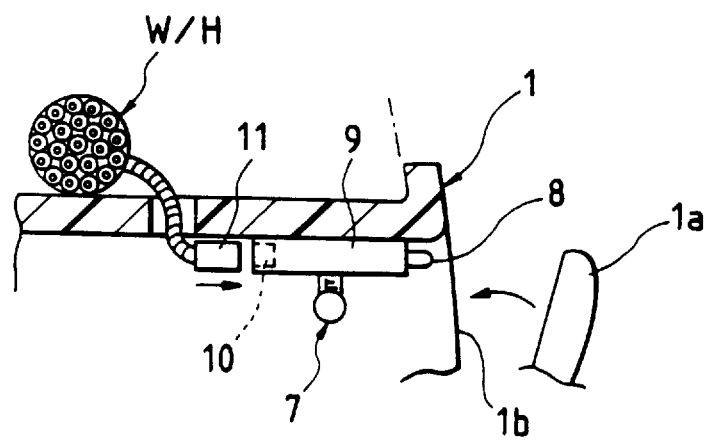
FIG. 9 is a sectional view of a main part of FIG. 5.

Further, FIGS. 7A to 7C show other embodiments of utilization of the glove box 1. In an embodiment shown in FIG. 7A, similarly to the foregoing embodiment, a computer C, a cellular telephone T, a transceiver can be mounted in a glove box 1, and, for example, a keyboard of the computer C is made so as to be able to be pulled out of and pushed into the box through a cover 1a. Facsimile equipment may be also attached. The cellular telephone T may be connected to a car navigation system so that one can obtain information concerning congestion, construction, and the like, through a telephone circuit. Further, one can transmit the location of the car concerned to an administrative chamber. In this case, a monitor, a microphone, and a speaker may be also provided.

In an embodiment shown in FIG. 7B, AC 100 V receptacles and a DC 12 V receptacle are provided on a glove box 1 and a light is attached on a side surface of the glove box 1. A power source is supplied from a battery through a wire harness (or a cord) directly to the DC 12 V receptacle and is supplied from the battery to the AC 100 V receptacles through an AC converter. Moreover, chargeable batteries are provided to the light and the receptacles, respectively, so that the batteries are charged while the vehicle is running. The light which can emit light of strong intensity is used so as to be sufficiently useful for fishing or camping at night, for attachment of chains at night, and so on. Although the glove box 1 is detached in use of the light, the light may be detached if the light is detachably attached. For example, a compressor for pumping up a rubber boat or the like is connected to the receptacle. In the drawing, the reference symbol SW designates a switch for turning on/off the light. The switch SW is designed so as to be disconnected from the wire harness by means of the connector when the glove box 1 is detached.

In an embodiment shown in FIG. 7C, a glove box 1 is designed so that heat can be supplied from a radiator into the inside of the glove box 1 and the heating operation is performed through a switch SW. By the supply of the heat, for example, milk for a baby can be heated or kept to be warm. Further, a function of an electric pot may be additionally provided.

The foregoing embodiments shown in FIGS. 7A to 7C may be combined with each other or may be desirably exchanged by one another. Further, for an aged driver, mikes may be attached on four corners of a car body so that the aged driver can hear sounds outside the car easily by using those mikes through an amplifier provided in the glove box 1. Moreover, in an emergency, the location (the latitude and longitude) of the vehicle may be transmitted by using a GPS, a cellular telephone T, a transceiver, or the like. In this case, there is provided an emergency switch for enabling the equipment to perform the operation.

As described above, according to the present invention, various electric equipment which are increasing more and more are accommodated (or attached) in the attachment positions of a glove box. Therefore, work for wiring the equipment or the like is relatively easily performed and various functions of the glove box can be improved. Further, the appearance of the glove box is not necessary to be changed from the conventional one.

In addition, because, in the attachment structure of a glove box lamp according to the present invention, lead wires of the wire harness are connected directly to the glove box lamp and the switch, the connector required in the prior art for connecting the glove box lamp is not required. Accordingly, not only the number of connectors attached to the wire harness can be reduced to attain reduction of cost but also the space occupied by the connector can be eliminated to attain space saving.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle glove box structure which is provided in a front portion in a vehicle, comprising:
    a first glove box provided in an instrument panel, said first glove box including at least one item of electric equipment in an inside thereof, said first glove box being detachably connected to said instrument panel so as to be replaced by a second glove box which has the same dimensions as that of said first glove box.

2. A vehicle glove box structure according to claim 1, further comprising:
    attaching means for detachably attaching said at least one item of electric equipment to said first glove box;
    connection means for receiving power sources and signals for said at least one item of electric equipment in said first glove box from other equipment provided outside said glove box; and
    distribution means for distributing said power sources and signals to said at least one item of electric equipment;
    wherein said attaching means, said connection means and said distribution means are provided in said first glove box.

3. A vehicle glove box structure according to claim 2,
    wherein said power sources and signals for said at least one item of electric equipments provided in said glove box are supplied from an instrument panel side.

4. A vehicle glove box structure according to claim 3, wherein said attaching means comprises;
    a first rail provided with said first glove box; and
    a second rail provided with said at least one item of electric equipments, said second rail is engaged with said first rail.

5. A vehicle glove box structure according to claim 3,
    wherein said at least one item of electric equipment includes at least one of a computer, a cellular telephone and a transceiver.

6. A vehicle glove box structure according to claim 3,
    wherein the inside of said first glove box is supplied with heat from a radiator.

7. An attachment structure of a car glove box lamp, comprising:
    a substrate having said glove box lamp and a switch for turning on/off said lamp, said substrate comprising a printed wiring board and said substrate being attached in a glove box;
    a current conduction path provided on said substrate; and
    at least one lead wire of a wire harness being directly connected to said current conduction path of said substrate.

8. An attachment structure of a car glove box lamp according to claim 7,
    wherein said wire harness connected to said current conduction path of said substrate is constituted by a flat harness.

9. An attachment structure of a car glove box lamp, comprising:
    a resinous protector attached to an inside wall of a car glove box, said protector having said glove box lamp and a switch for turning on/off said lamp attached to a side wall thereof and said protector forming a channel; and
    a wire harness constituted by ribbon jumper wires and inserted into the channel of said protector;
    wherein a part of said ribbon jumper wires is connected to said lamp and to said switch.

* * * * *